United States Patent [19]

Engel

[11] Patent Number: 4,840,422

[45] Date of Patent: Jun. 20, 1989

[54] TRAILER AIR GRILL

[76] Inventor: Thomas H. Engel, 45 Terry Ct., Hollister, Calif. 93502

[21] Appl. No.: 140,475

[22] Filed: Jan. 4, 1988

[51] Int. Cl.[4] .............................................. B62D 37/02
[52] U.S. Cl. .................................. 296/180.4; 296/24.2; 98/6; 98/121.1
[58] Field of Search ...................... 296/1 S, 24 C, 181, 296/208; 98/6, 121.1

[56] References Cited

U.S. PATENT DOCUMENTS

| | | | |
|---|---|---|---|
| 660,046 | 10/1900 | Clarke | 98/6 X |
| 3,053,224 | 4/1960 | Pierce | 296/24 C X |
| 3,239,267 | 3/1966 | Reynolds | |
| 3,385,198 | 5/1968 | Farr | 98/121.1 X |
| 3,415,566 | 12/1968 | Kerrigan | 296/1 S |
| 3,516,707 | 6/1970 | Wilfert | 296/1 S X |
| 3,695,673 | 10/1972 | Meadows | 296/1 S |
| 3,697,120 | 10/1972 | Saunders | 296/1 S |
| 3,797,879 | 3/1974 | Edwards | 296/1 S |
| 3,815,948 | 6/1974 | Alford | 296/1 S |
| 3,836,191 | 9/1974 | Gotz | 296/1 S |
| 3,892,438 | 7/1975 | John | 296/1 S |
| 3,947,065 | 3/1976 | Geiger | 296/1 S |
| 3,977,716 | 8/1976 | Whited | 296/1 S |
| 4,103,957 | 8/1978 | Landry et al. | 296/1 S |
| 4,545,294 | 10/1985 | Dayus | 98/121.1 X |

FOREIGN PATENT DOCUMENTS

| | | | |
|---|---|---|---|
| 0724062 | of 0000 | France | 296/24 C |
| 1281065 | 2/1961 | France | 296/1 S |
| 1336673 | 3/1962 | France | 296/1 S |

Primary Examiner—Dennis H. Pedder
Assistant Examiner—John M. Gruber
Attorney, Agent, or Firm—Bill D. McCarthy

[57] ABSTRACT

A trailer air grill mounted in a front and opposing side walls of a trailer and having a front intake air grill with louvers in the front wall which direct the airflow at an angle toward the side wall discharge air grills. An interior V-shaped deflector barrier centered at the back of the front intake air grill further enhances the deflection of the airflow to the side wall discharge air grills.

9 Claims, 1 Drawing Sheet

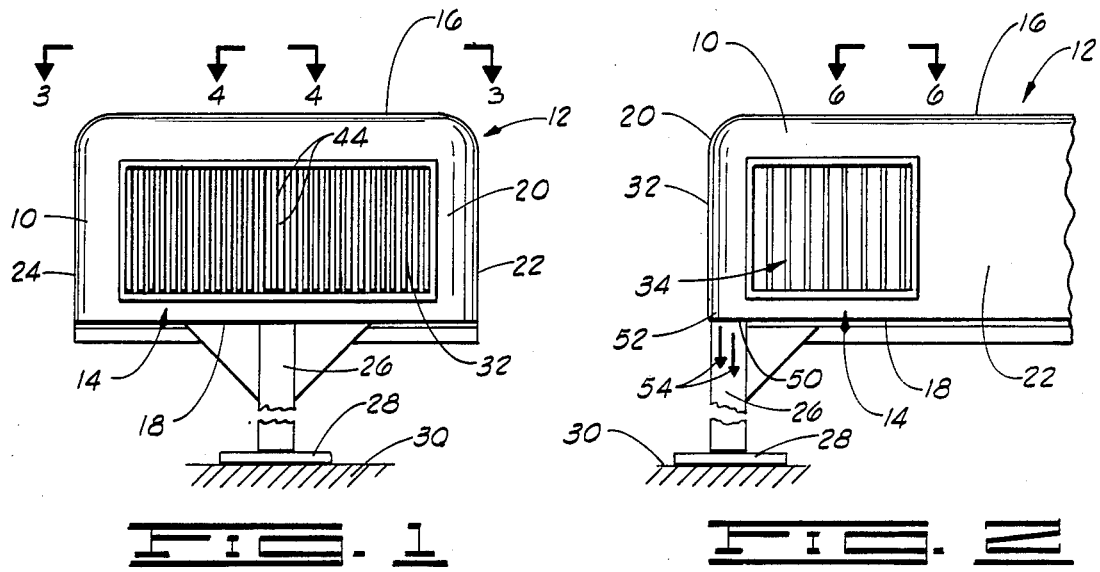
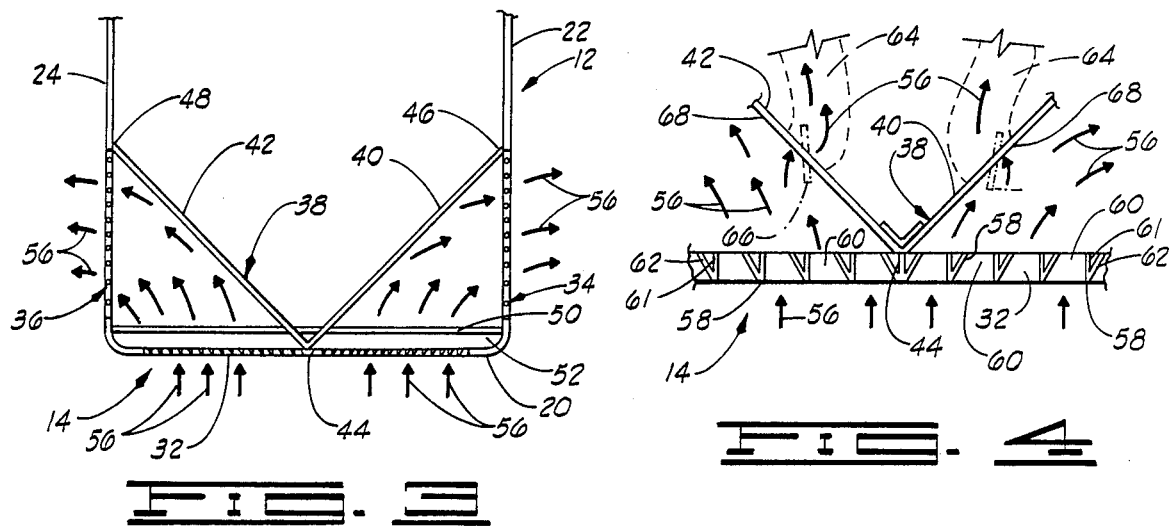
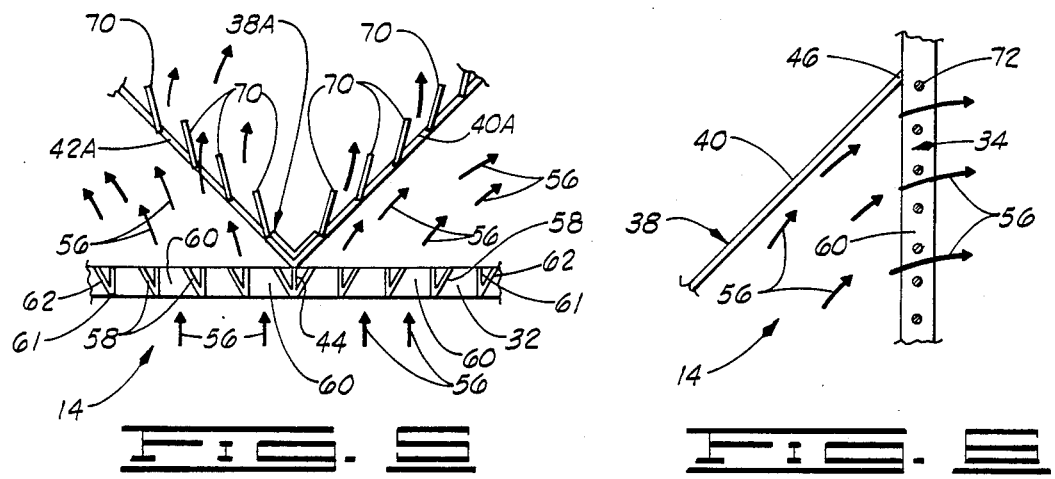

TRAILER AIR GRILL

BACKGROUND OF THE INVENTION

1. Field of the Invention.

The present invention relates to air deflectors for vehicles, and more particularly but not by way of limitation, to an air grill used with a trailer for improved stability when the trailer is pulled by a vehicle.

2. Brief Description of the Prior Art.

Heretofore there have been different types of air deflectors for large highway tractor-trailer rigs for reducing air flow drag and improving fuel mileage. These air deflectors are described in U.S. Pat. No. 3,695,673 to Meadows, U.S. Pat. No. 3,947,065 to Geiger, U.S. Pat. No. 3,797,879 to Edwards, U.S. Pat. No. 4,103,957 to Landry, et al., U.S. Pat. No. 3,697,120 to Saunders, and U.S. Pat. No. 3,415,566 to Kerrigan. These air deflectors do not act as a grill for receiving and discharging air flow for improved trailer stability.

In U.S. Pat. No. 3,892,438 to John, air channeling ducts are mounted in the body of a camper or trailer to provide air flow from high pressure to low pressure areas of the vehicle. U.S. Pat. No. 3,836,191 to Gotz describes air guide channels that extend from the front end wall of a truck cab to the side walls of the cab. U.S. Pat. No. 3,815,948 to Alford and U.S. Pat. No. 3,239,267 to Reynolds describe a deflector wall and wind diverter awning for travel trailers.

None of the above mentioned air deflector devices are similar in structure when compared to the subject invention nor do they provide the advantages of the unique trailer air grill as described herein.

SUMMARY OF THE INVENTION

The present invention provides a trailer air grill adapted for mounting in the front wall, a side wall and an opposite side wall of a trailer or the like. The trailer air grill comprises a front intake air grill having vertical stationary louvers which are angled to direct air flow toward a pair of side wall discharge air grills mounted in the opposite side walls. An interior V-shaped deflector barrier is disposed directly behind the front intake air grill with a pointed center portion of the deflector barrier centered on the back of the front intake air grill. The deflector barrier extends rearwardly with the opposite ends of the deflector barrier attached to the interior side walls of the trailer rearward of the side wall discharge air grills. The deflector barrier enchances the deflection of the air flow to the side wall discharge air grills.

An object of the subject invention is to provide a trailer with built-in air grills which progressively deflect impacting air to the sides of the trailer for improved stability and reduce fishtailing of the trailer.

Another object of the invention is to reduce air flow drag against the front wall of the trailer and in turn improve fuel mileage of the vehicle pulling the trailer.

Other objects, advantages and features of the present invention will become clear from the following detailed description when read in conjunction with the drawings and appended claims.

BRIEF DESCRIPTION OF THE DRAWINGS

FIGS. 1 and 2 are partial front and side views of a gooseneck trailer with the trailer air grill installed therein.

FIG. 3 is a top sectional plan view of the trailer taken along lines 3—3 shown in FIG. 1.

FIG. 4 is an enlarged top sectional plan view of the trailer air grill taken along lines 4—4 shown in FIG. 1.

FIG. 5 is similar to FIG. 4 with the trailer air grill having a V-shaped deflector barrier with adjustable louvers built therein.

FIG. 6 is an enlarged top sectional plan view taken along lines 6—6 shown in FIG. 2.

DESCRIPTION

Referring now to the drawings, and more particularly to FIG. 1, shown therein is a partial view of a front end 10 of a gooseneck trailer having a general reference numeral 12. While the gooseneck trailer 12 is shown in the drawings it can be appreciated that any number of different type trailers can use the trailer air grill of the present invention which is designated herein by general reference numeral 14.

The trailer 12 has a top 16, a bottom 18, a front wall 20, a side wall 22 and an opposite side wall 24. The rear portion of the trailer 12 is not shown in the drawings. Attached to a portion of the bottom 18 of the trailer is an upright post 26 having a fifth wheel 28 used for connecting the trailer 12 to a bed 30 of a pickup truck or the like. Only a small portion of the bed 30 is shown in FIGS. 1 and 2 and the truck or pulling vehicle is not shown in the drawings.

The trailer air grill 14 improves the stability of the trailer 12 and the fuel mileage of the vehicle pulling the trailer 12. The trailer air grill 14 comprises a front wall intake air grill 32, a first side wall discharge air grill 34, a second side wall discharge air grill 36 and an interior V-shaped air deflector barrier 38 having a first barrier wall 40 and a second barrier wall 42. The deflector barrier 38, and its first and second barrier walls 40 and 42, are shown in FIGS. 3, 4 and 5. The first side wall discharge air grill 34 is shown in FIG. 2 mounted in the side wall 22, and the second side wall discharge air grill 36 mounted in the opposite side wall 24 is shown in FIG. 3.

In FIG. 3 a top sectional plan view of the trailer 12 and trailer air grill 14 is shown with the top 16 of the trailer 12 removed to show the trailer air grill 14. As shown in this view the profile of the deflector barrier 38 has a pointed center portion 44 disposed against the back of the front wall intake air grill 32 and centered thereon. The deflector barrier 38 extends from the top of the front wall intake air grill 32 to the bottom of the front wall intake air grill 32 with the barrier's first and second barrier walls 40 and 42 extending rearwardly forming a V-shape with an end portion 46 of the first barrier wall 40 attached to the interior wall of the trailer 12 rearward of the first side wall discharge air grill 34 by conventional fasteners. An end portion 48 of the second barrier wall 42 is similarly attached to the interior wall of the trailer 12 rearward of the second side wall discharge air grill 36.

Disposed behind the front wall 20 and parallel thereto and below the front of the deflector barrier 38 is a vertical panel 50 which makes up one side of an elongated opening 52 in the bottom 18 of the trailer 12. The opening 52 allows rain and moisture received through the trailer air grill 14 to drain from the trailer 12 as it is received. The rain and moisture are depicted by arrows 54 in FIG. 2.

Arrows 56 shown in FIGS. 3, 4, 5 and 6 represent airflow received through the front wall intake air grill 32 with the airflow 56 to the right of the center portion 44 of the deflector barrier 38 deflected toward the first side wall discharge air grill 34 and therethrough. The airflow 56 to the left of the center portion 44 of the deflector barrier 38 is deflected toward the second side wall discharge air grill 36 and therethrough.

In FIG. 4 an enlarged top sectional plan view taken along lines 4—4 in FIG. 1 is shown with the top 16 of the trailer 12 removed. The front wall intake air grill 32 is made up of a plurality of stationary vertical louvers 58 with air spaces 60 therebetween for receiving the airflow 56 therethrough. The stationary vertical louvers 58 in the front wall intake air grill 32 when viewed in cross-section as shown in FIG. 4 and FIG. 5 have a wedge-shaped profile with one side 61 vertical and the other side 62 approximately 30° C. to the right of vertical when the stationary vertical louvers 58 are located to the right of the center portion 44. When the stationary vertical louvers 58 are located to the left of the center portion 44 the side 62 of the stationary louvers 58 is approximately 30° C. to the left of vertical. It will be appreciated that the wedge-shaped stationary vertical louvers 58 split a portion of the airflow 56 impacting the front wall 20 of the trailer 12 into two streams; that is, the airflow 56 is split in the middle as it engages the stationary vertical louvers 58 of the front wall intake air grill 32 with the airflow 56 passing therethrough. The airflow 56 is deflected toward either the first or second side wall discharge air grills 34 and 36.

To insure that the airflow 56 continues to be directed toward the first and second discharge air grills 34 and 36, the first and second barrier walls 40 and 42 of the deflector barrier 38 are angled at approximately 45° C. from the vertical front and side walls 20, 22, 24 to enhance the deflection of the airflow 56. In this manner the airflow 56 is substantially evenly discharged out the side wall discharge air grills 34, 36 in the opposing side walls 22, 24 of the trailer 12, thereby providing greater stability and reducing the likelihood of the trailer 12 fishtailing as it is pulled behind a vehicle.

Should it be desired to provide air ventilation to the rear of the trailer 12 when animals are carried therein, or for any other ventilation requirement, the deflector barrier 38 can include air ducts 64 with dampers 66 attached to the sides of openings 68 in the first and second barrier walls 40 and 42. The air ducts 64 and dampers 66 are shown in dash lines, and when the dampers 66 are opened, a portion of the airflow 56 is directed through the air ducts 64 to the interior of the trailer 12.

FIG. 5 is similar to FIG. 4, but rather than using air ducts 64, first and second barrier walls 40A and 42A of deflector barrier 38A comprise a plurality of vertical rotatable louvers 70 which can be opened as shown for directing a portion of the airflow 56 to the interior of the trailer 12.

In FIG. 6 an enlarged top sectional plan view of the first side wall discharge air grill 34 is shown. The first side wall discharge air grill 34 comprises a plurality of vertically extending rod members 72 which, in practice, are preferably three eighth inch rods on two inch center spacings. Part of the airflow 56 is permitted to flow unimpeded through the first side wall discharge air grill 34. A portion of the airflow 56 is similarly discharged through the second side wall discharge air grill 36 as shown in FIG. 3, the second side wall discharge air grill 36 also comprising a plurality of vertically extending rod members 72.

It will be clear that the present invention is well adapted to carry out the objects and attain the advantages mentioned as well as those inherent therein. While a presently preferred embodiment of the invention has been described for purposes of this disclosure, numerous changes can be made which will readily suggest themselves to those skilled in the art and which are encompassed within the spirit of the invention disclosed and as defined in the appended claims.

What is claimed is:

1. A trailer air grill adapted for mounting in a front wall, a side wall and an opposite side wall of a trailer, the trailer air grill comprising:
   a front wall intake air grill mounted in the front wall, the front wall intake air grill having stationary louvers mounted therein for directing airflow at an angle when air impacting the front wall intake air grill is received therethrough;
   a first side wall discharge air grill mounted in the side wall;
   a second side wall discharge air grill mounted in the opposite side wall, the stationary louvers in the front wall intake air grill directing substantially half of the airflow toward the first side wall discharge air grill and the other half of the airflow toward the second side wall discharge air grill; and
   an interior V-shaped deflector barrier centered at the back of the front wall intake air grill to deflect the airflow to the first and second side wall discharge air grills.

2. The trailer air grill as described in claim 1 wherein the interior V-shaped deflector barrier has first and second barrier walls angled toward each other and joined together at a pointed center portion at the back of the front intake air grill and substantially centered thereon.

3. The trailer air grill as described in claim 2 wherein the first and second barrier walls of the interior V-shaped deflector barrier further comprise means for directing a portion of the airflow to the interior of the trailer.

4. A trailer air grill adapted for mounting in a front wall and opposing side walls of a trailer, the trailer air grill comprising:
   front wall intake air grill means mounted in the front wall for directing airflow at a selected angle when received therethrough, the front wall intake air grill means having louvers mounted therein;
   side wall discharge air grill means mounted in the opposing side walls for discharging airflow therefrom, the side wall discharge air grill means comprising first and second side wall discharge air grills in the opposing side walls, the louvers of the front wall intake air grill means wedge-shaped in cross section for directing substantially half of the airflow at an angle toward the first side wall discharge air grill and the other half of the airflow at an angle toward the second side wall discharge air grill; and
   interior V-shaped deflector barrier means centered at the back of the front wall intake air grill means for enhancing the deflection of the air flow to the first and second side wall discharge air grills.

5. The trailer air grill as described in claim 4 wherein the interior V-shaped deflector barrier means comprises first and second barrier walls, one end of the first barrier wall disposed rearward to the first side wall discharge air grill and one end of the second barrier wall disposed rearward to the second side wall discharge air grill, the first and second barrier walls angled toward each other and joined together at a pointed center portion at the back of the front wall intake grill and substantially centered thereon.

6. A trailer air grill adapted for mounting in a front wall and opposing side walls of a trailer, the trailer air grill comprising:

front wall intake air grill means mounted in the front wall for directing airflow at a selected angle when air impacting the front wall intake air grill is received therethrough, the front wall intake air grill means having louvers mounted therein;

side wall discharge air grill means mounted in the opposing side walls for discharging airflow therefrom, the side wall discharge air grill means comprising first and second side wall discharge air grills in the opposing side walls, the louvers of the front wall intake air grill means wedge-shaped in cross section for directing substantially half of the airflow at an angle toward the first side wall discharge air grill and the other half of the airflow at an angle toward the second side wall discharge air grill;

interior V-shaped deflector barrier means centered at the back of the front wall intake air grill means for enhancing the deflection of the air flow to the first and second side wall discharge air grills, the interior V-shaped deflector barrier means comprising first and second barrier walls, one end of the first barrier wall disposed rearward to the first side wall discharge air grill and one end of the second barrier wall disposed rearward to the second side wall discharge air grill, the first and second barrier walls angled toward each other and joined together at a pointed center portion at the back of the front wall intake grill and substantially centered thereon; and air ducts with dampers, the air ducts mounted in openings in the first and second barrier walls for passing a portion of the airflow to the interior of the trailer.

7. The trailer air grill as described in claim 6 wherein the first and second side wall discharge grills have spaced apart rod members mounted therein for permitting air passage therebetween.

8. A trailer air grill adapted for mounting in a front wall and opposing side walls of a trailer, the trailer air grill comprising:

front wall intake air grill means mounted in the front wall for directing airflow at a selected angle when air impacting the front wall intake air grill is received therethrough, the front wall intake air grill means having louvers mounted therein;

side wall discharge air grill means mounted in the opposing side walls for discharging airflow therefrom, the side wall discharge air grill means comprising first and second side wall discharge air grills in the opposing side walls, the louvers of the front wall intake air grill means wedge-shaped in cross section for directing substantially half of the airflow at an angle toward the first side wall discharge air grill and the other half of the airflow at an angle toward the second side wall discharge air grill;

interior V-shaped deflector barrier means centered at the back of the front wall intake air grill means for enhancing the deflection of the air flow to the first and second side wall discharge air grills, the interior V-shaped deflector barrier means comprising first and second barrier walls, one end of the first barrier wall disposed rearward to the first side wall discharge air grill and one end of the second barrier wall disposed rearward to the second side wall discharge air grill, the first and second barrier walls angled toward each other and joined together at a pointed center portion at the back of the front wall intake grill and substantially centered thereon; and vertical rotatable louvers mounted in the first and second barrier walls for selectively passing a portion of the airflow to the interior of the trailer.

9. The trailer air grill as described in claim 8 wherein the first and second side wall discharge grills have spaced apart rod members mounted therein for permitting air passage therebetween.

* * * * *